H. P. WESTCOTT.
ATTACHMENT FOR DIFFERENTIAL AND STATIC PRESSURE GAGES.
APPLICATION FILED JUNE 24, 1919.

1,385,234. Patented July 19, 1921.

Witness
Chas. S. Hoyer.

Inventor
Henry P. Westcott.
By
Attorney

UNITED STATES PATENT OFFICE.

HENRY P. WESTCOTT, OF ERIE, PENNSYLVANIA.

ATTACHMENT FOR DIFFERENTIAL AND STATIC PRESSURE GAGES.

1,385,234.   Specification of Letters Patent.   Patented July 19, 1921.

Application filed June 24, 1919. Serial No. 306,397.

*To all whom it may concern:*

Be it known that I, HENRY P. WESTCOTT, a citizen of the United States, residing at Erie, in the county of Erie and State of Pennsylvania, have invented new and useful Improvements in Attachments for Differential and Static Pressure Gages, of which the following is a specification.

This invention relates to an attachment for recording differential and static pressure gages for gas lines and especially gas lines having an orifice meter installed therein, of the type illustrated in my patent No. 1,172,087, February 15, 1916, and the patent to G. X. Wittmer, No. 716,973, December 30, 1902, and the essential objects in view are to prevent the mercury from being blown out of the mercury float chamber or pot of the gage and whereby the quantity of the mercury in the chamber or pot is diminished when the differential pressure becomes greater than the maximum pressure recording range of the indicating means or chart, and obviate the necessity of replenishing or resupplying the float chamber container or pot with the requisite quantity of mercury after each blow out, and to maintain the gage in accurate automatic working condition, economize in the use of mercury and produce a conveniently and reliably operating pressure gage.

With these and other objects and advantages in view, the invention consists in the construction and arrangement of parts hereinafter described and claimed.

In the drawings:—

Figure 1:
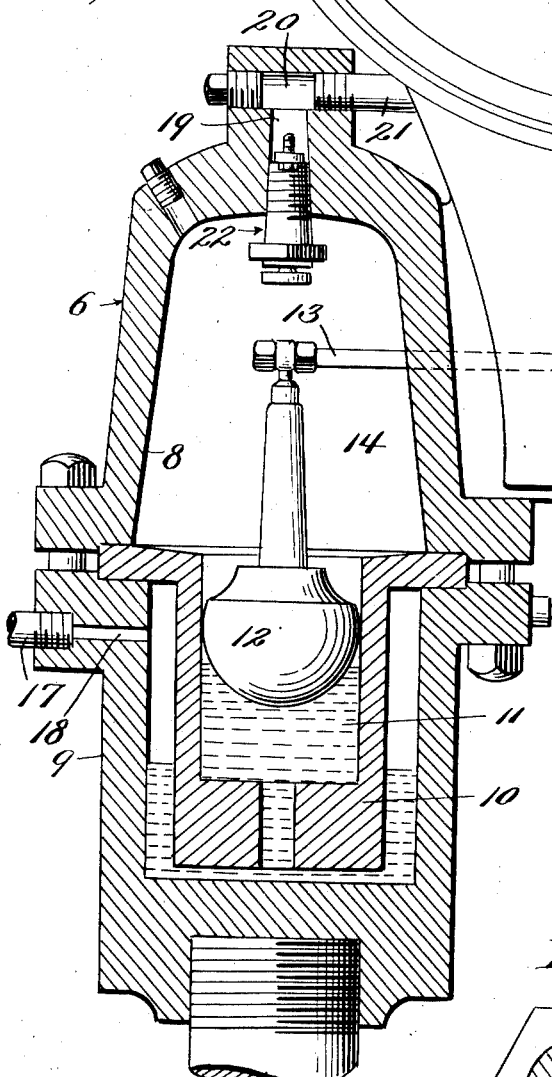
Figure 1 is a sectional elevation of portions of a pressure gage showing the improved attachment applied thereto.

The improved attachment as hereinbefore indicated is applied to and forms a part of a recording static pressure gage 5 and a mercury float differential gage 6, the organization of these parts being such that a record will be given both as to static and differential pressure on one chart through the medium of two hands or indices 7 as fully explained in my patent hereinbefore specified.

The recording static pressure gage 5 and the mercury float differential gage 6 in the main form no part of the present invention, the latter being confined to an attachment mounted in the outlet portion of the mercury float differential gage. The well known structural features shown in the drawing to illustrate the practicability of the improved attachment will only be generally referred to. It is sufficient to designate and state by way of description that the numeral 5 refers to a recording static pressure gage without specifying the details of construction of the latter. The mercury float differential gage comprises an inclosure or casing consisting of an upper casting or chambered cap 8 secured to a lower chambered casting or section 9 which in turn is adapted to be supported on a main pipe for the gas and wherein an orifice meter is mounted. The lower casting or section 9 is provided with a mercury pot 10 supplied with a quantity of mercury as shown at 11 and having a float 12 operatively disposed therein and engaging the mercury. The upper end of the float 12 is connected to a pivoted lever 13 extending into the chamber 14 of the upper casting or cap 8. The lever 13 extends into the lower portion of the pressure gage 5, as indicated by dotted lines, and is connected to a shaft as at 13ª, shown in dotted lines, said shaft having in turn one of the hands or indices 7 connected thereto, as also illustrated in dotted lines. The movement of the float is transmitted to the arm 13 and the latter in turn operates the shaft 13ª and the hand or indicia 7 connected to said shaft. This construction and operation is well understood in the art and forms no part of the present invention. The lower chamber casting or section 9 has an inlet pipe 17 attached thereto and in practice will extend to and have communication with the main pipe. As shown in the drawing, this inlet connection 17 is applied in communication with an upper bore 18 opening into the chamber of the lower casting or section 9. At the center of the top of the cap 8 an outlet bore 19 is formed which is partially screw threaded and opens into a cross bore 20 having an outlet 21 connecting with the record static pressure gage 5 as shown. The lever 13 having the float 12 attached thereto is free to move vertically within the chamber 14 of the top casting or cap 8 directly below the bore 19 which is preferably located at the center of the upper portion of the said casting or cap.

Figure 2:
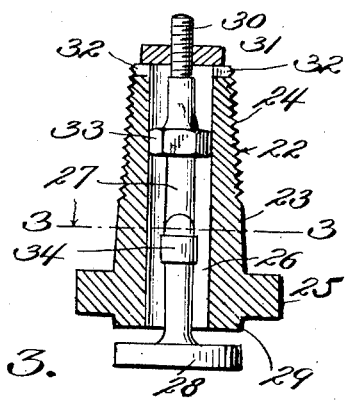
Fig. 2 is a detail transverse vertical section of the improved attachment.
Figure 3:
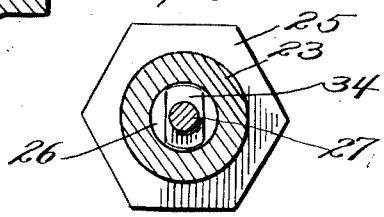
Fig. 3 is a horizontal section taken in the plane of the line 3—3 Fig. 2.

The improved attachment consists generally of an automatically operating valve device 22 comprising a shell or casing 23 with upper exterior screw threads 24 to engage threads of the bore 19 for holding the attachment in place. The lower portion of the shell or casing 23 has a polygonal surface wrench engaging flange 25 located at a short distance above the lower end of said casing or shell and whereby the attachment as a whole may be applied in operative position. Extending centrally through the shell or casing 23 is a bore 26 and therein a valved stem 27 of materially less diameter than the bore is mounted to have free or loose movement, the lower end of the valve stem being provided with a disk valve 28 which is adapted to close tightly against the lower end 29 of the shell or casing 23 and cut off communication between the bore 26 and the upper portion of the chamber 14 of the top casting or cap 8. The upper extremity of the valve stem 27 is threaded as at 30 and has an adjusting nut or washer 31 applied thereto and adapted to rest or bear upon the upper end of the shell or casing 23. At diametrically opposite points the upper end of the shell or casing 23 has outlet passages 32 formed therein to permit gas passing through the bore 26 to escape therefrom and enter the part of the bore 19 above the attachment and thence pass through the outlet 21 which connects with the downstream side of the orifice in the gas line. The disk valve 28 is normally open or remains in the position shown by Figs. 1 and 2 when the gas has a differential pressure within the maximum recording range of the gage 5. When the differential pressure becomes excessive or is greater than the maximum recording range of the gage 5, the float 12 is thrown upwardly together with the lever 13 to which it is connected and said lever strikes the bottom of the disk valve 28 and cuts off communication between the bore 26 and the chamber 14 and thereby the mercury from the pot 10 is prevented from being blown out through the bore 19, and after the differential pressure becomes normal or within the range of the gage 5, the mercury will fall back into the pot without loss. The valve stem 27 and valve 28 are held in central relation yet free to move with relation to the shell or casing 23 by guides 33 and 34 disposed at different elevations on the valve stem and at planes at right angles to each other. These guides are of similar construction and comparatively narrow in width, but have their opposite ends in loose engagement with diametrically opposite portions of the wall of the bore 26. By constructing the guides in the manner just specified, the bore 26 is not in the least obstructed to the passage of the gas therethrough.

From the foregoing it will be seen that the improved attachment is essentially an automatically operated check valve comprising a loose stem and valve that may be readily applied and is free in its operation, particularly in returning to normal position after the excessive volume has ceased to effect the meter and at which time the gage will continue to record the differential pressure without requiring any particular attention such as resetting or replenishing with mercury. The improved attachment is very advantageous in view of the inconvenience in the operation of similar gages now in use which do not in any manner check or obviate the loss of the mercury and require frequent attention to replenish or resupply the mercury pot with mercury sufficient to replace that which has been blown out in order to have the gage resume normal working condition after being subjected to excessive pressure. The valve stem 27 may be adjusted relatively to the shell or casing 23 either to bring the valve disk 28 closer to or farther from the lower end of the said shell or casing by shifting or moving the adjusting nut or washer 31 on the upper screw threaded extremity of the valve stem. It will also be seen that the use of a spring or a plurality of springs is dispensed with in the improved attachment and the excessive pressure exercised through the upward throw of the lever 13 will only have to overcome the weight of the valve stem 27 and disk 28 on the lower end thereof, the latter having a gravitating movement within the shell or casing when relieved of excessive pressure.

What is claimed is:—

1. The combination with a differential pressure gage organization of the class specified having a float chamber and an inclosure chamber thereover, and movable support for the float above the latter, the chambers being provided with an inlet and outlet and a loosely operating normally open check valve mounted in the outlet and having a movable closure part adapted to be engaged by a portion of the support of the float to close the said outlet when the float is subjected to excessive pressure.

2. The combination with a pressure gage of the class specified embodying a chambered inclosure having a mercury content with a float therein, a movable lever connected to the float and an inlet and an outlet, of a normally open check valve mounted in the said outlet and having a loose gravitating member adapted to be automatically closed by the arm to close the said outlet when the mercury and float are subjected to excessive pressure.

3. The combination with a gage of the class specified embodying a chambered inclosure having an inlet and an outlet and float means engaging a fluid in a part of the inclosure, the outlet being normally open and normally open means mounted in the outlet and provided with a movable gravitating part adapted to be engaged by a portion of the float for automatically closing the outlet when the float and fluid are subjected to excessive pressure.

In testimony whereof I have hereunto set my hand in presence of two subscribing witnesses.

HENRY P. WESTCOTT.

Witnesses:
ALBERT F. GRISWOLD,
A. B. GALLAGHER.